US012000240B2

(12) United States Patent
Cain et al.

(10) Patent No.: US 12,000,240 B2
(45) Date of Patent: Jun. 4, 2024

(54) FRACK VALVE GREASING SYSTEM (71) Applicant: Patriot Research Center, LLC, Houston, TX (US)

(72) Inventors: Brandon Cain, Houston, TX (US); Joseph Opitz, Wellington, CO (US); Manish Agarwal, Cypress, TX (US); Michael Pursley, Woodlands, TX (US)

(73) Assignee: Patriot Research Center, LLC, Houston, TX (US)

( * ) Notice: Subject to any disclaimer, the term of this patent is extended or adjusted under 35 U.S.C. 154(b) by 299 days.

(21) Appl. No.: 17/117,386

(22) Filed: Dec. 10, 2020

(65) Prior Publication Data

US 2022/0186583 A1 Jun. 16, 2022

(51) Int. Cl.
*E21B 34/02* (2006.01)
*E21B 43/26* (2006.01)
*F16N 13/22* (2006.01)

(52) U.S. Cl.
CPC .............. *E21B 34/02* (2013.01); *E21B 43/26* (2013.01); *F16N 13/22* (2013.01); *F16N 2210/00* (2013.01); *F16N 2280/00* (2013.01)

(58) Field of Classification Search
CPC ...... E21B 34/02; E21B 43/26; E21B 43/2607; F16N 13/22; F16N 2210/00; F16N 2280/00; F16N 11/00
See application file for complete search history.

(56) References Cited

U.S. PATENT DOCUMENTS

| | | | | | |
|---|---|---|---|---|---|
| 2,420,970 | A | * | 5/1947 | Parker | F16N 13/22 |
| | | | | | 123/449 |
| 3,024,869 | A | * | 3/1962 | Akamatsu | F16N 25/02 |
| | | | | | 184/7.4 |
| 10,100,978 | B2 | * | 10/2018 | Gouge | F16N 11/00 |
| 10,753,535 | B2 | * | 8/2020 | McKim | F16N 13/22 |
| 11,125,385 | B2 | * | 9/2021 | Gouge | F16N 11/00 |
| 11,137,109 | B2 | * | 10/2021 | Babineaux | F16N 11/08 |
| 11,352,552 | B1 | * | 6/2022 | Fisher | C09K 8/80 |
| 11,359,765 | B2 | * | 6/2022 | Gouge | F16N 7/385 |
| 2015/0345272 | A1 | * | 12/2015 | Kajaria | E21B 34/025 |
| | | | | | 166/308.1 |
| 2017/0038003 | A1 | * | 2/2017 | Conley | F16N 7/385 |
| 2017/0114957 | A1 | * | 4/2017 | Conley | F16N 29/02 |
| 2017/0146189 | A1 | * | 5/2017 | Herman | F16N 25/00 |
| 2017/0276293 | A1 | * | 9/2017 | McKim | F16N 21/00 |
| 2017/0336022 | A1 | * | 11/2017 | Gouge | F16N 25/00 |
| 2020/0347990 | A1 | * | 11/2020 | McKim | F16N 25/00 |
| 2022/0186583 | A1 | * | 6/2022 | Cain | F16N 11/00 |
| 2022/0186877 | A1 | * | 6/2022 | Cotton | F16K 37/0008 |

* cited by examiner

Primary Examiner — Michael A Riegelman
(74) Attorney, Agent, or Firm — Ramey LLP (57) ABSTRACT A greasing system may be placed partially within the red zone and partially outside of the red zone. Grease and pneumatic power is supplied from outside of the red zone to a pod, inside of the red zone, having local storage, high-pressure pumping capacity, and a distribution mechanism. The grease is supplied from outside of the red zone to the pod at low-pressure through a hose having at least a 1 inch inside diameter and is usually at least 100 feet long. The pod pressurizes the grease to a high-pressure and distributes the grease via a distribution mechanism to a relatively short hose, generally less than 8 feet between the distribution mechanism and the greasing point on the wellhead, in order to minimize pressure losses.

14 Claims, 6 Drawing Sheets

FRACK VALVE GREASING SYSTEM

BACKGROUND

A typical oil and gas well generally includes a wellhead with a frack tree at the surface. The frack tree, in turn, generally consists of one or more large bore gate valves that allow pumping high-pressure fluids, including proppant, into the wellbore. High-pressure fluid, when injected into a hydrocarbon bearing formation, causes fissures in the formation rock that radiate out from the wellbore. However, when the high-pressure fluid is removed the fissures close. When proppant, generally sand, is injected into the formation along with the high-pressure fluid then as the fissures are formed, proppant is also forced into the fissures. When the pressure is removed from the fluid within the fissures, the proppant remains within the fissures. Generally, the proppant has a relatively small diameter in order to be carried into the fissures and has a relatively high compressive strength such that when the pressure is removed the proppant that remains within the fissures prevents the fissures from closing. The fissures are then able to provide channels for fluids to move from the formation into the wellbore. Material such as sand and ground walnut shells are commonly used.

Today a single well may see 40 or more pumping cycles in order to fracture each hydrocarbon bearing formation within the well. A typical frack job may require over 10 million barrels of water and several hundred thousand pounds of proppant. During the frack job, all valves that are downstream of the frack pumps such as the frack tree valves, as well as other devices having gate valves such as the zipper manifolds are set to full flow to allow the high pressure frack fluid to move through the valves. While the operator is pumping the high-pressure frack fluid, on the order of 12,000 to 15,000 psi, the sand laden fluid is forced into every small opening from the top of the frack tree to the bottom of the well including any nooks or crannies in the large bore valves that make up the frack tree.

Generally, the large bore valves are gate valves. Each of the gates sits between a pair of seats. When the gate transits between an open and closed position the gate floats between each of the seats. When a gate is closed pressurized fluid will push against the gate causing the gate to land on the seat on the opposite side of the pressurized fluid. When the gate lands on the seat a seal is formed to prevent fluid flow past the gate and seat. However on the side of the gate towards the fluid there is a gap between the seat and the gate. This gap allows pressurized fluid to flow around the gate and into the space where the gate moves when it's open. The pressurized fluid is generally proppant laden therefore the proppant moves with the fluid into the space behind the gate. When enough proppant moves into the space behind the gate, the gate is no longer operable as there is no room behind the gate for the gate to move off the seat and into its open position. Additionally, in many instances the proppant, which is usually sand, is highly abrasive and a small amount of the abrasive proppant will remain on the fluid side of the gate between the gate in the seat such that when the gate slides open the abrasive proppant drags across the gate and the seat causing scratches and abrasions into the surface of both the gate and the seat which in turn degrades the valves ability to seal. Therefore, in order to keep the valves operable as long as possible, every so often the frack operation is shut down and the valve is closed. Once the frack operation is stopped grease is applied to the valve in an effort to push the proppant out of the valves' nooks and crannies and in particular the area behind the gate. Generally, the grease very viscous and is also used to try to seal the gates in order to prevent leaking which allows a proppant damaged valve to continue to operate at some degraded capacity until it reaches a point at which it must be replaced.

One of the largest drawbacks to current greasing systems is that due to the high viscosity of the grease, the distances required for the high viscosity grease to be pumped in order to stay out of the red zone, and the usually small internal diameter of the hoses, leads to pressure losses along the distance of the hoses that significantly reduce the available grease pressure at the frack valve.

Generally, there is an area around the high-pressure pumping equipment including the various hoses and other devices to distribute the high-pressure frack fluid as well as an area around the well due to the high-pressure pumping and the potentially flammable hydrocarbons. This area is considered the "red zone" and while fracking operations are being conducted people are not allowed into this area. Therefore, current grease equipment typically uses hoses which are ½ inch in outer diameter but due to the requirement that the hoses be able to withstand 15,000 psi or more internal pressure the hoses may only have 3/16 of an inch inner diameter. Additionally, due to the requirements to stay out of the red zone the hoses may be 100 or more feet long. In many cases, due to internal friction and other losses along the hoses, the capabilities of the pumps and hoses may be exceeded when attempting to provide 15,000 psi at the frack valves.

SUMMARY

In an embodiment of the current invention a trailer has a significant amount of grease, generally in excess of 1500 pounds of grease, the trailer also includes an air supply capable of supplying as much as 200 psi of air, and a high-volume low-pressure grease pump capable of supplying grease at 7500 psi and 168 cubic inches per minute. The trailer is kept outside of the red zone. Inside of the red zone, adjacent to the frack valves is a local storage unit. The local storage unit includes a reservoir for a smaller amount of grease, generally about 120 pounds of grease. The local storage unit also includes an air operated high-pressure grease pump. The air operated high-pressure grease pump has an input connected to the grease reservoir and an output connected to a manifold. The manifold has an input connected to the air operated high-pressure grease pump. The manifold also has at least 2 output ports. The output ports are usually attached to high-pressure, 15,000 psi, grease hoses. In turn each of the grease hoses are directly connected to a port on a frack valve. The air operated high-pressure grease pump is connected to the air supply on the trailer by an air hose that does not need to be pressure rated any higher than 200 psi. The reservoir on the local storage unit is connected to the high-volume low-pressure grease pump by a grease supply hose that has relatively large inner diameter, usually having an inner diameter of 1 inch or more.

In most instances the grease supply system includes multiple grease meters. Generally, the local storage unit will include a grease flow meter between the air operated high-pressure grease pump and the frack valve. The grease flow meter between the air operated high-pressure grease pump and the frack valve lets the operator know how much grease has been pumped into a particular frack valve or the group of frack valves. In certain embodiments a first grease flow meter may be placed between the air operated high-pressure grease pump and the manifold to provide to the operator data as to the amount of grease that is pumped into the manifold. Additionally, a second grease flow meter may be placed between each output port from the manifold and the frack valves to provide to the operator data as to the amount of grease is pumped into each frack valve. A third flow meter may also be placed between the high-volume, low-pressure grease pump and the local storage unit to provide to the operator data as to the amount of grease that is pumped to the local storage unit. In many instances the operator may obtain the amount of grease pumped into the manifold from the first grease flow meter in order to determine how much grease to pump from the grease reservoir to the local storage unit. In some instances, the local storage unit may incorporate a visual indicator to notify the operator as to whether the local storage unit is empty, full, or somewhere in between. In other instances, the local storage unit may incorporate a locally operated valve to allow grease to flow into the local storage unit or to prevent grease from flowing into the local storage unit. When the local storage unit includes the locally operated valve to allow or prevent grease flow into the local storage unit grease may be constantly supplied to the local storage unit by the high flow low-pressure pump and only allowed into the local storage unit as required.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
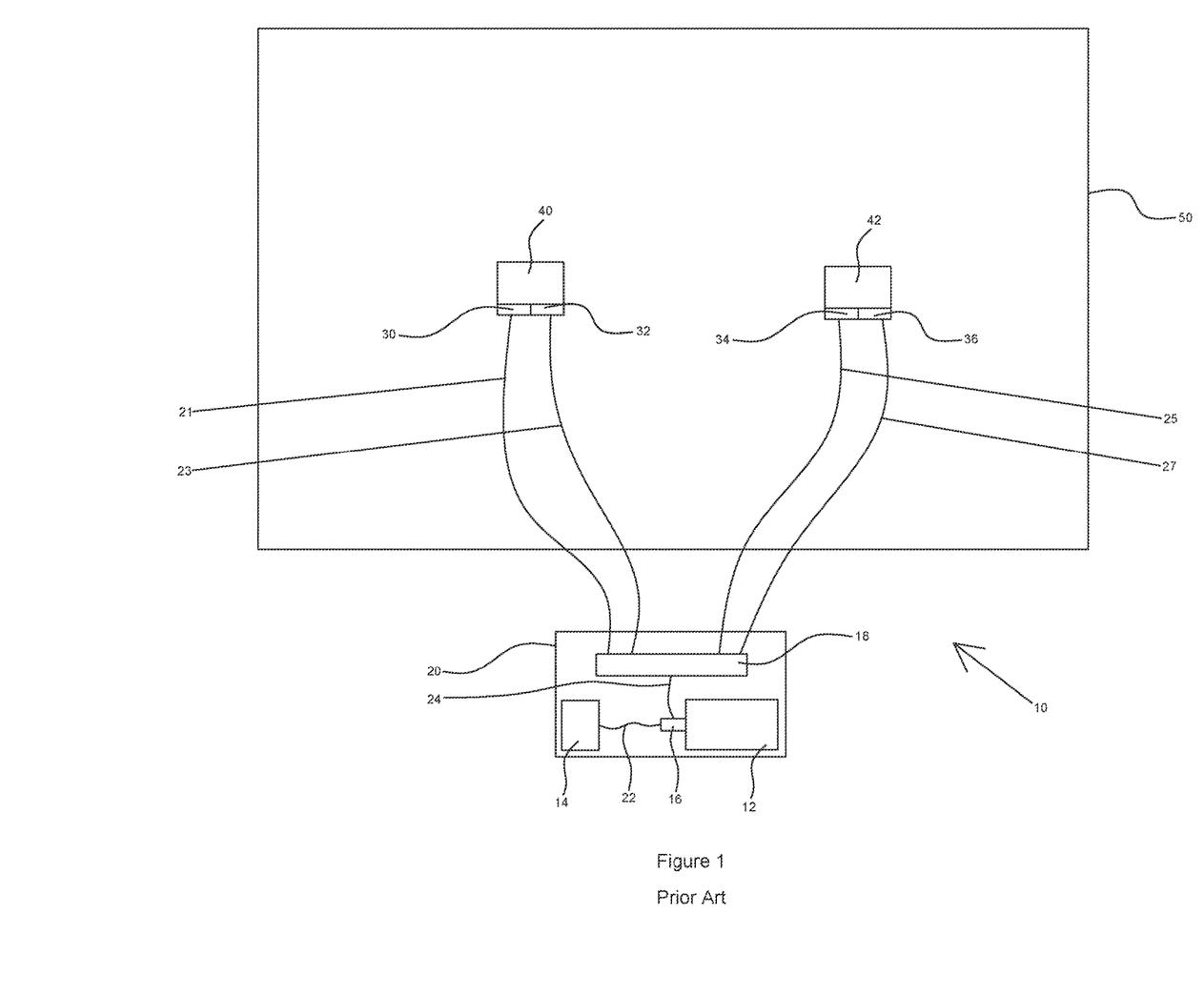
FIG. 1 is a representation of a prior art greasing system.

FIG. 1 is a representation of a prior art greasing system 10. The prior art greasing system 10 includes a grease reservoir 12, an air supply 14, a high-pressure grease pump 16, and a manifold 18. The prior art greasing system 10 may be mounted on a skid or trailer 20. The air supply 14 supplies pressurized air, usually at less than 200 psi, to the high-pressure grease pump 16 by hose or line 22. The high-pressure grease pump 16 is supplied with grease from the grease reservoir 12 and in turn supplies the grease to manifold 18 via line or hose 24. The high-pressure grease pump 16 usually supplies the grease to the manifold 18 at up to 15,000 psi. The manifold 18 supplies the now pressurized grease to any combination of valve actuators 30, 32, 34, or 36. As depicted, valve actuators 30 and 32 are on wellhead 40 while valve actuators 34 and 36 are on wellhead 42. Unfortunately, wellheads 40 and 42 along with their associated valve actuators 30, 32, 34, and 36 respectively are within the red zone 50. The red zone 50 is a designated area around the high pressure equipment, in particular the frack valves, usually 100 feet or more from the nearest wellhead, that is exceptionally dangerous due to the presence of flammable hydrocarbons from the wells and the high-pressure fluids and gases within the wellheads. Due to the need to keep people and explosion hazards out of the red zone, generally the skid or trailer 20 and most of the equipment, such as the grease reservoir 12, air supply 14, high-pressure grease pump 16, and manifold 18, located on the skid or trailer 20 are placed outside of the red zone. Therefore, in order to supply the valve actuators 30, 32, 34, and 36 with pressurized grease from the manifold 18, hoses 21, 23, 25, and 27, each over 100 feet long, are utilized. Unfortunately, there are significant pressure losses associated with moving viscous fluids through hoses or pipes that are significantly longer than their diameter. In this case the hoses are typically 100 feet long with an inner diameter of ⅜ of an inch or less.

Table 1 is a comparison of the pressure drop in a first pipe having a length of 100 feet and an inner diameter of ⅜ of an inch, a second pipe having a length of 10 feet and an inner diameter of ⅜ of an inch, a third pipe having a length of 100 feet and an inner diameter of 1 inch, and a fourth pipe having a length of 10 feet and an inner diameter of 1 inch. The pressure drop through a pipe may be represented by the equation:

$$\Delta P = P_1 - P_2 = \frac{8\mu L V_{avg}}{R^2}$$

where $\Delta P$ is used to designate a pressure drop therefore $P_1-P_2$ or $\Delta P=P_1-P_2$. $\mu$ the average dynamic viscosity of the fluid, in this case we will use the average kinematic dynamic of water at 60° F. which is 0.000021966 lbf*s/ft². We will also set the average velocity or $V_{avg}$ at 200 ft./m or 3.33 ft./s. L is the length of the pipe in feet while R is the radius of the pipe in feet.

TABLE 1

| | | |
|---|---|---|
| 100' | 239.69 | 33.71 |
| 10' | 23.97 | 3.37 |
| L D | 0.03125' (0.375") | 0.0833' (1.0") |

As can be seen in table 1 the pressure drop between a 100 foot length of pipe or hose and a 10 foot length of pipe or hose is almost tenfold given the same inner diameter of the hose or pipe. The pressure losses associated with long hoses versus short hoses at the pressures required makes the use of a long hose unacceptable.

Figure 2:
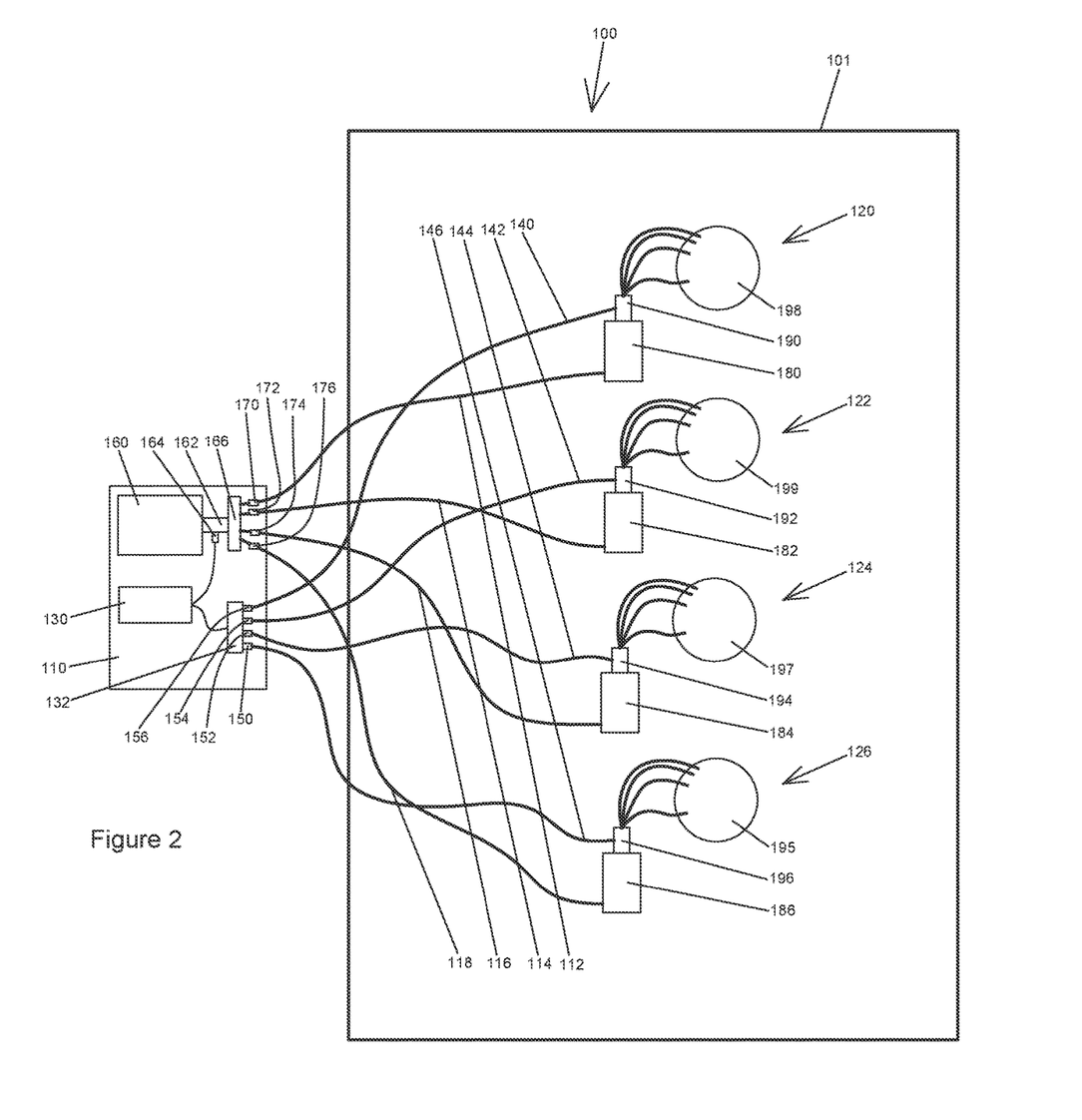
FIG. 2 is a representation of an embodiment of the current invention.

FIG. 2 is a representation of an embodiment of the current invention. The grease distribution system 100 includes a supply source 110, low-pressure supply lines 112, 114, 116, and 118, and pods 120 122, 124, and 126. The supply source 110 includes an air source 130. The air source 130 provides pressurized air, usually at less than 200 psi, to manifold 132. Manifold 132 distributes the pressurized air to air supply lines 140, 142, 144, and 146. Generally, a valve, such as valves 150, 152, 154, and 156, controls the airflow from manifold 132 to the air supply lines 140, 142, 144, and 146. The valve may be a simple on-off valve such as a ball valve or the valve may be able to control the quantity and/or pressure of air that passes into air supply lines 140, 142, 144, and 146. The supply source 130 also includes grease reservoir 160. The grease reservoir 160 in turn supplies a low-pressure, less than 8000 psi, high-volume, at least 210 cubic inches per minute, grease pump 162. The grease pump 162 may be electrically or hydraulically driven but is preferably air-driven. The air source 130 supplies pressurized air to the grease pump 162. A valve 164 may be placed between the air source 130 and the grease pump 162 to control the pressurized airflow to the grease pump 162. The valve 164 may simply be an on-off valve such as a ball valve to isolate the air source 130 from the grease pump 162 or the valve 164 may regulate the pressure and or the quantity of airflow to control the amount and or pressure of the grease on the output side of the grease pump 162. The output of grease pump 162 is supplied to grease manifold 166. The grease manifold 166 distributes the grease supplied by grease pump 162 to low-pressure supply lines 112, 114, 116, and 118. Generally, low pressure signifies a pressure rating that is insufficient to supply fracturing pressure to a frack valve or well. A valve, such as valves 170, 172, 174, and 176, may be utilized to control the grease flow from grease manifold 166 to each of the low-pressure supply lines 112, 114, 116, and 118. Preferably, each of the valves 170, 172, 174, and 176 are simply on off ball valves however other type of valves may be used.

Each of the pods 120, 122, 124, and 126 includes a local storage 180, 182, 184, and 186. The local storage 180, 182, 184, and 186 are each connected to their respective low-pressure supply lines 112, 114, 116, and 118 and provides a reservoir for the grease that is supplied to each of the local storage 180, 182, 184, and 186 via the low-pressure supply lines 112, 114, 116, and 118. In turn each local storage 180, 182, 184, and 186 is fluidly connected to and provides grease to a high-pressure grease pump, such as high-pressure grease pumps 190, 192, 194, and 196. The high-pressure grease pumps 190, 192, 194 and 196 are air-driven high-pressure grease pumps and are connected to their respective air supply lines 140, 142, 144, and 146 where the airflow through the air supply lines 140, 142, 144, and 146 is controlled by their respective valves 150, 152, 154, and 156 and the airflow ultimately controls the air-driven high-pressure grease pumps 190, 192, 194, and 196. The output from each of the air-driven, high-pressure grease pumps 190, 192, 194, or 196 is distributed to the various greasing points on a wellhead such as wellhead 195, 197, 199, or 198.

A red zone is an area, depicted here as the area within boundary 101, within which people or equipment that is not explosion proof is prohibited at certain times such as when a well is being fracked. Each of the pods 120, 122, 124, and 126 are allowed within the red zone while the supply source 110 must be kept out of the red zone. The low-pressure grease supply lines 112, 114, 116, and 118 as well as the air supply lines 140, 142, 144, and 146 cross from outside of the red zone at the supply source 110 to inside of the red zone to each of the pods 120, 122, 124, and 126.

Figure 3:
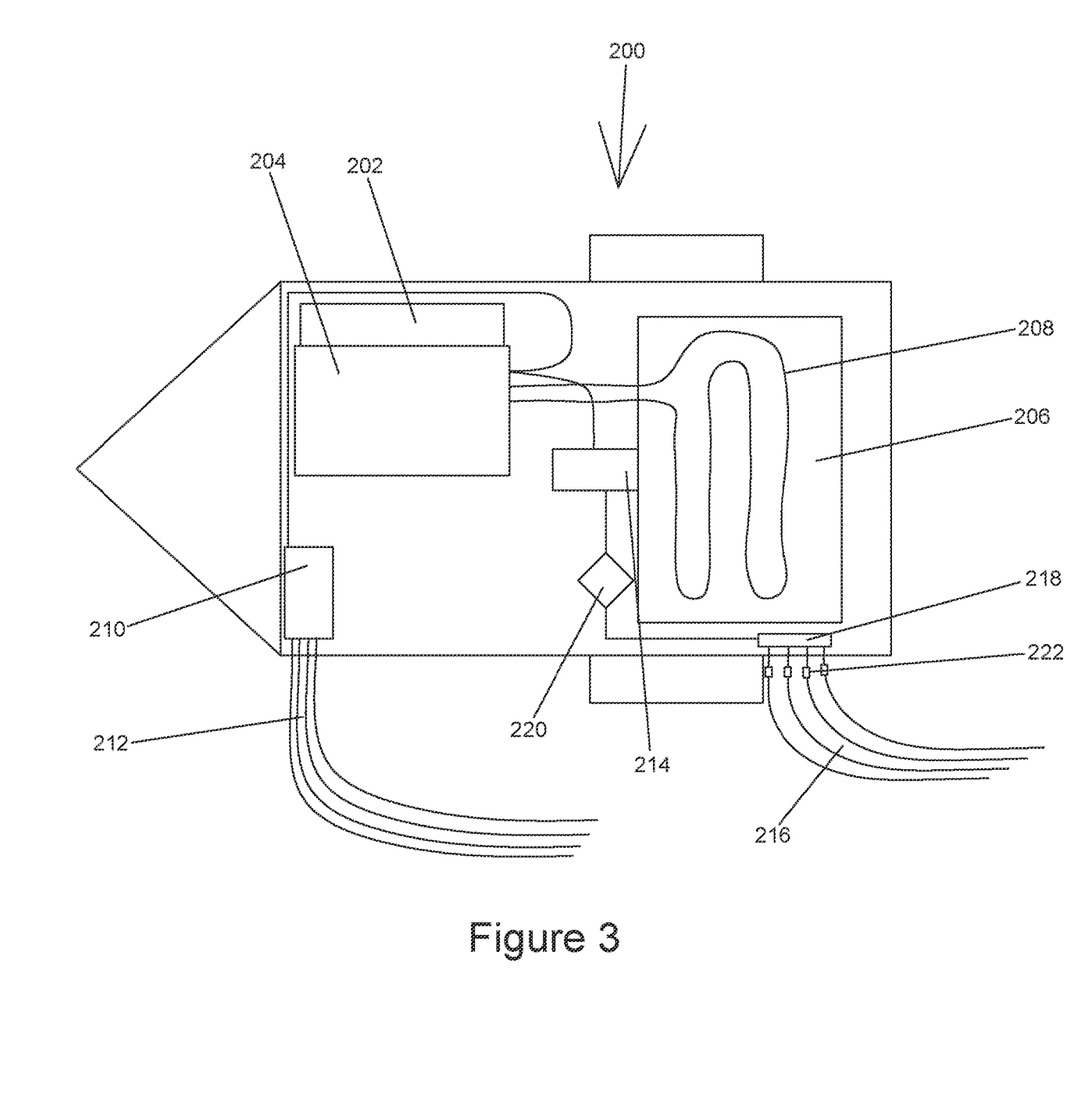
FIG. 3 is a detailed depiction of a supply source.

FIG. 3 is a preferred embodiment of a supply source 200. The supply source 200 includes a fuel tank 202 which supplies fuel to an air compressor and generator 204. The supply source 200 also includes a grease tank 206. Preferably the grease tank 206 includes a number of heater elements 208 to allow heating the grease in the grease tank 206 in order to prevent the grease from becoming too viscous to pump in cold weather. The air compressor 204 supplies air to air distribution manifold 210 where the air supply is distributed to various air supply lines such as air supply lines 212. Preferably each air supply line includes a regulator that controls the amount and/or pressure of air being distributed to each of the air supply lines 212. The air compressor 204 also supplies air to low-pressure grease pump 214. The low-pressure grease pump 214 receives grease from grease tank 206 and in turn supplies a high-volume of grease at relatively low pressure to each of the pods via low-pressure grease distribution lines 216. Typically, the low-pressure grease distribution lines 216 have an inner diameter of 1 inch or more in order to reduce pressure loss as the grease is being pumped from the low-pressure grease pump 214 to the pods (such as pods 180, 182, 184, or 186 from FIG. 2). The low-pressure grease pump 214 pumps grease to a distribution manifold 218. An in-line grease meter 220 may be included downstream of the low-pressure grease pump 214. The distribution manifold 218 has an input from the low-pressure grease pump 214 and has outputs connected to each of the low-pressure grease distribution lines 216. Generally, a valve, such as valves 222, is connected between the distribution manifold 218 and the low-pressure grease distribution lines 216. The valves 222 are typically on/off valves that either allow or prevent grease flow into the low-pressure grease distribution lines 216 and thus to the pods.

Figure 4:
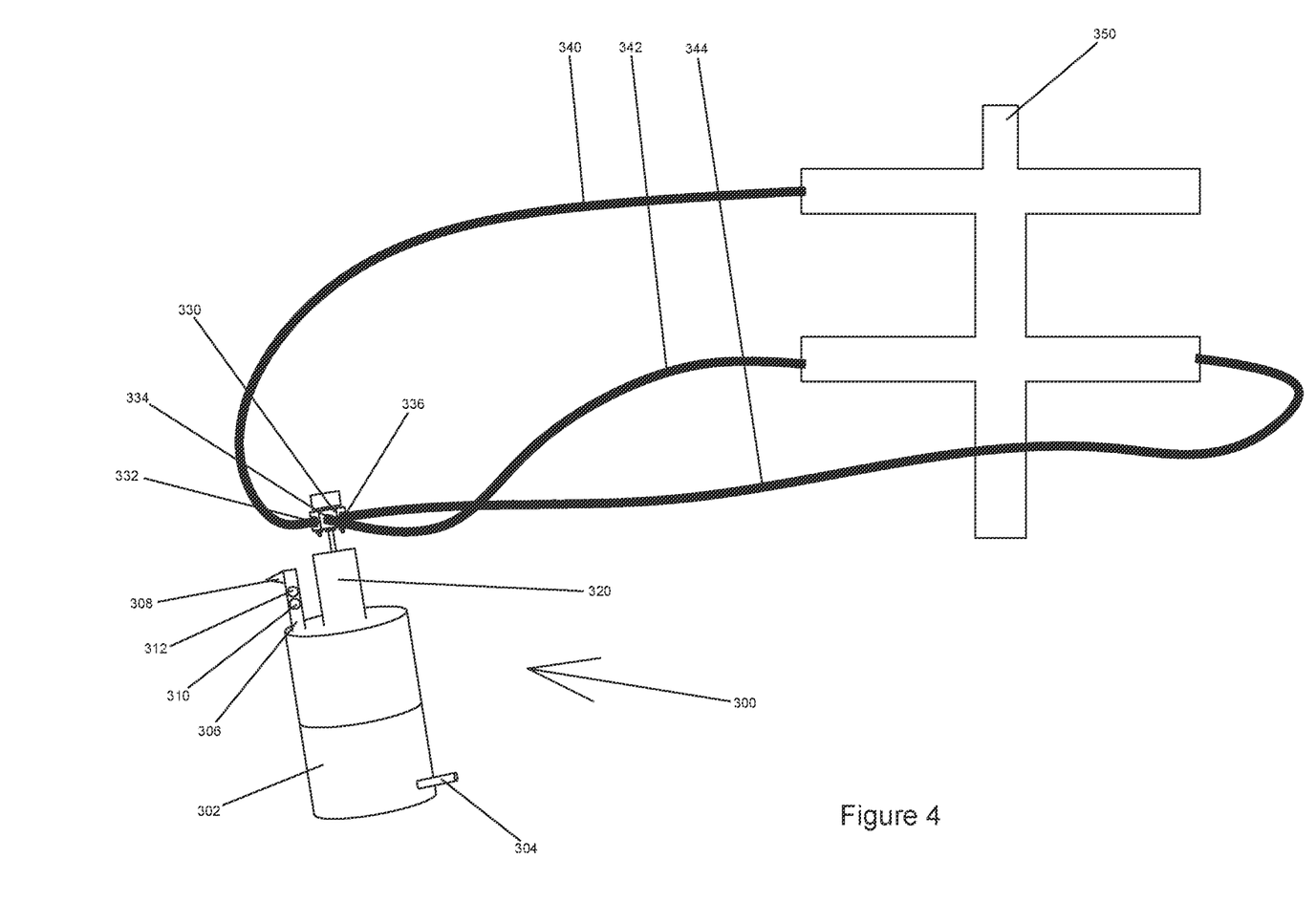
FIG. 4 is a representation of a pod connected to various greasing points on a wellhead.

FIG. 4 depicts a pod 300 connected to various greasing points, usually for each frack valve, on a wellhead. The pod 300 includes a storage tank 302. The storage tank 302 has an inlet 304 that is attached to any of the low-pressure grease supply lines. The storage tank 302 also includes a grease level indicator 306. In some instances, the grease level indicator may display lights 310 and or a mechanical indicator such as a flag 312 where a raised or visible flag may indicate a low grease level within the storage tank 302 and where a light or combination of lights that may be on or off or display various colors when illuminated to indicate the grease level within storage tank 302. The storage tank 302 is typically adjacent to the high-pressure grease pump 320 and supplies grease to high-pressure grease pump 320. An air supply line from the supply source (supply source 110 in FIG. 2) is also connected to high-pressure grease pump 320 and supplies the power to operate the high-pressure grease pump 320. The high-pressure grease pump 320 then supplies the grease from storage tank 302 at high-pressure, where the grease pressure from the high-pressure grease pump 320 is at least sufficient to overcome the pressure within the frack valve during fracking and in some instances to up to 15,000 psi, to grease distributor 330. Grease distributor 330 has an input and at least 2 outputs. In this case grease distributor 330 has output 332, 334, and 336. Each of the outputs 332, 334, and 336 may be connected to a high-pressure, capable of withstanding up to 15,000 psi, grease distribution hose, such as hose 340, 342, and 344. One or more of the outputs may be blocked and do not provide a connection to the wellhead 350.

Figure 5:
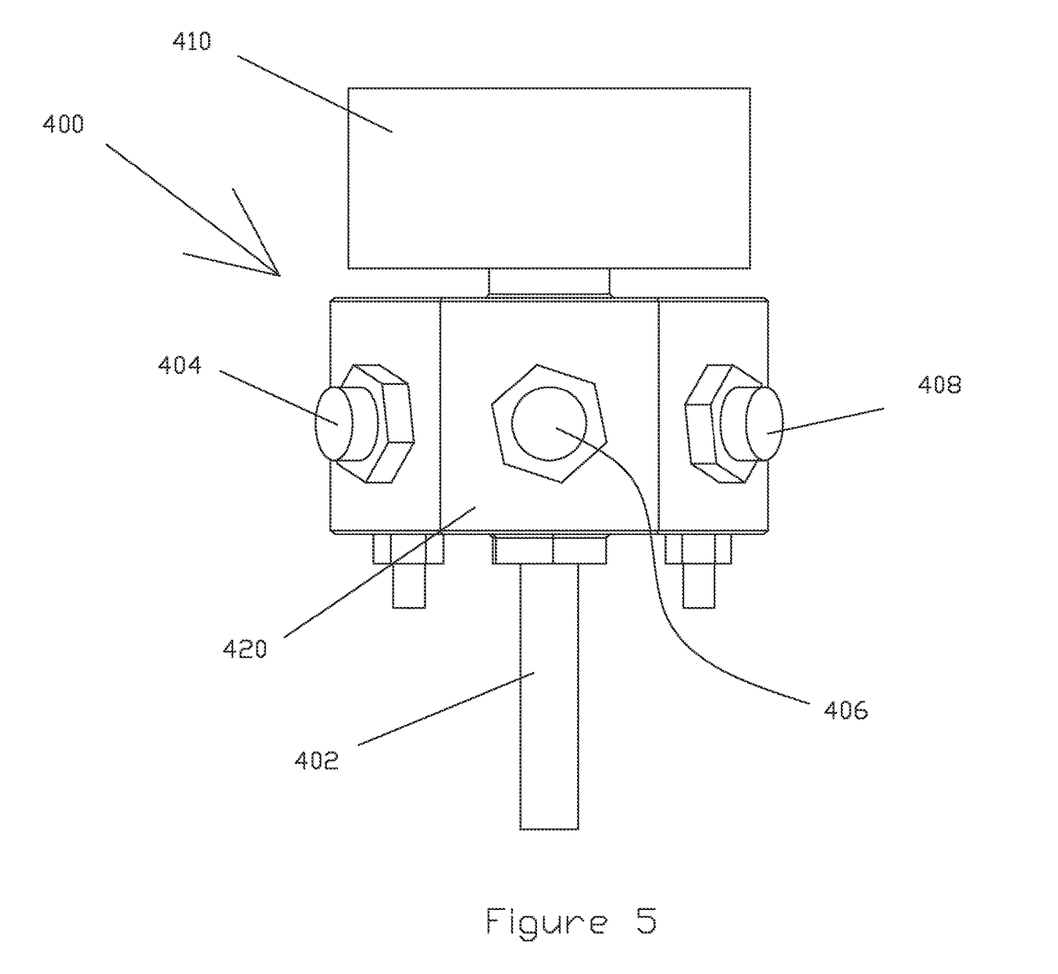
FIG. 5 is a side view of a grease distributor.
Figure 5A:
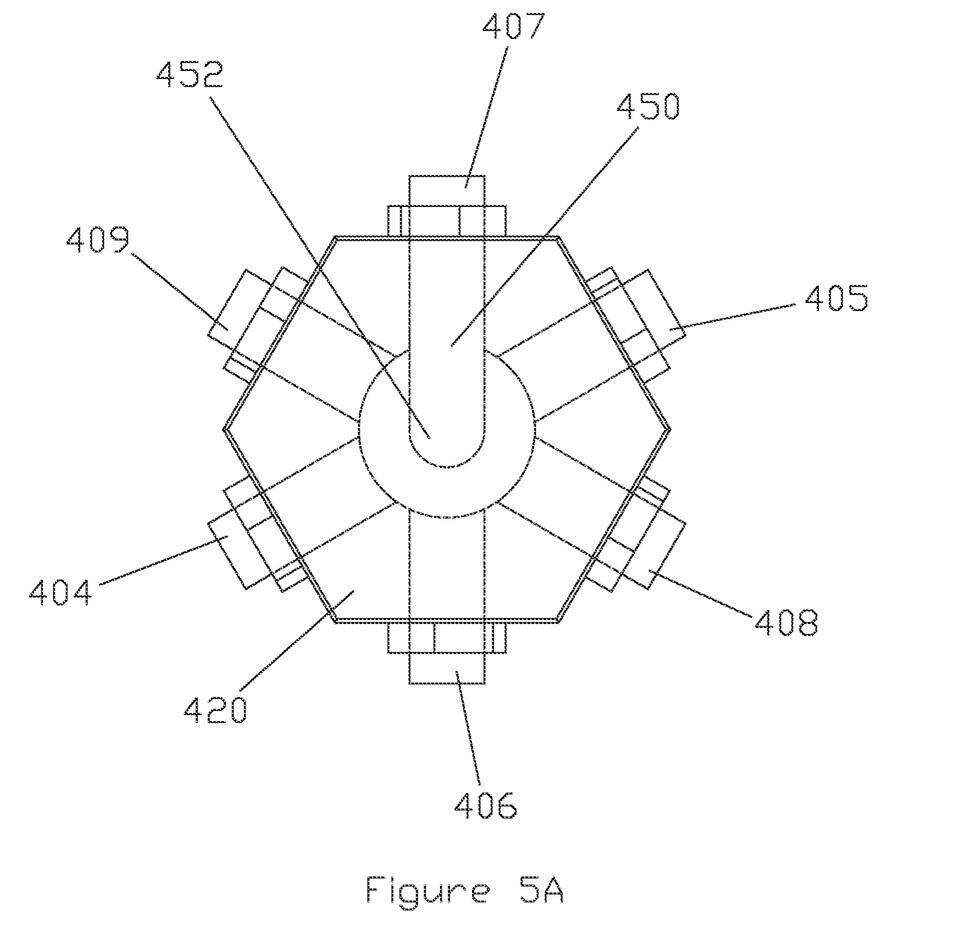
FIG. 5A is a top view of a grease distributor.

FIGS. 5 and 5A are a more detailed depiction of a grease distributor 400. The grease distributor 400 includes an input 402 that receives high-pressure grease from the high-pressure grease pump. The high-pressure grease then flows into the interior of grease distributor 400 where a movable flowpath 450 directs the grease to any one of the outputs such as output 404, 406, or 408. The movable flowpath 450 receives the grease from input 402 and is then rotated by a motor such as air-driven motor 410 to align the movable flowpath output 452 with any of the outputs 404-409. In the event that no output is desired or access to an output that is not adjacent to the previously supplied output the movable flowpath 450 may be raised or lowered within a bore within housing 420 such that housing 420 blocks the grease flowpath for as long as desired by the operator or during the movable flowpath's 450 rotation from a first flowpath to a second flowpath or non-adjacent flowpath.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A greasing system comprising:
a first grease storage fluidly connected to a first grease pump,
the first grease pump fluidly connected to and providing grease to a second grease storage,
the second grease storage having less storage capacity than the first grease storage and fluidly connected to a second grease pump,
wherein the first grease pump provides lower grease pressure than the second grease pump, and
wherein the first grease pump provides higher grease volume than the second grease pump,
the second grease pump fluidly connected to and providing grease to a rotary grease distributor,
wherein the rotary grease distributor is sequentially fluidly connected to at least two frack valves; and
wherein the rotary grease distributor comprises an air motor-driven movable flowpath configured to alternatingly provide grease to any one of a plurality of outputs.

2. The greasing system of claim 1 wherein, the second grease pump provides higher pressure than the first grease pump.

3. The greasing system of claim 1 wherein, the second grease pump provides sufficient pressure to overcome the pressure within the at least two frack valves during fracking.

4. The greasing system of claim 1 wherein, the second grease pump provides 15,000 psi output pressure.

5. The greasing system of claim 1 wherein, the second grease storage is adjacent to the second grease pump.

6. The greasing system of claim 1 wherein, the first grease pump is outside of a red zone.

7. The greasing system of claim 1 wherein, the first grease pump is located at least 100 feet from the at least two frack valves.

8. The greasing system of claim 1 wherein, first grease pump supplies grease to the second storage at low pressure.

9. The greasing system of claim 1 wherein, the second storage includes a grease level indicator.

10. The greasing system of claim 9 wherein, the grease level indicator is a light.

11. The greasing system of claim 9 wherein, the grease level indicator is a mechanical indicator.

12. The greasing system of claim 9 wherein, the grease level indicator is a flag.

13. The greasing system of claim 1 wherein, the rotary grease distributor has an input and at least 2 outputs.

14. The greasing system of claim 13 wherein, the rotary grease distributor does not provide a fluid flow path between the input and more than 1 of the at least 2 outputs at any given time.

* * * * *